United States Patent
VanZeeland et al.

[11] Patent Number: 5,743,666
[45] Date of Patent: Apr. 28, 1998

[54] ADJUSTABLE KEYBOARD

[75] Inventors: Anthony VanZeeland, Mesa; Dale Retter, Scottsdale; Stefen Dikov, Glendale, all of Ariz.

[73] Assignee: DataHand Systems, Inc., Phoenix, Ariz.

[21] Appl. No.: 805,292

[22] Filed: Feb. 25, 1997

[51] Int. Cl.⁶ .................................................. B41J 5/08
[52] U.S. Cl. ........................ 400/485; 400/492; 248/118.1
[58] Field of Search ................................ 400/485, 492; 341/20, 22, 23; 248/118.1, 118.3, 118.5, 292.12; 345/168, 169, 172

[56] References Cited

U.S. PATENT DOCUMENTS

| | | | |
|---|---|---|---|
| 4,201,489 | 5/1980 | Zapp | 400/485 |
| 4,913,573 | 4/1990 | Retter | 400/485 |
| 4,917,516 | 4/1990 | Retter | 400/489 |
| 4,971,465 | 11/1990 | Hashimoto | 400/485 |
| 5,439,304 | 8/1995 | Phillips et al. | 400/492 |

Primary Examiner—Edgar S. Burr
Assistant Examiner—Amanda B. Sandusky
Attorney, Agent, or Firm—LaValle D. Ptak

[57] ABSTRACT

An ergometrically improved keyboard data input device particularly suited for computers includes a housing adapted to underlie the palm of the hand of an operator in a relaxed, natural, concave position; so that the fingertips of each finger extend substantially vertically downward through an aperture in the top of the housing. Data input keys are mounted on a data input key support member located inside the housing, beneath the aperture. The keys are arranged in groups of data input keys in three dimensional patterns at each of the fingertip positions of the hand of the operator. The device includes a provision for raising and lowering the key support member within the housing, relative to the aperture. Actuators also independently move the opposite ends of the key support member back and forth within the housing, relative to the aperture, to adjust the locations of the groups of keys relative to the portion underlying the palm of the hand of a user to compensate for hands of different sizes.

13 Claims, 2 Drawing Sheets

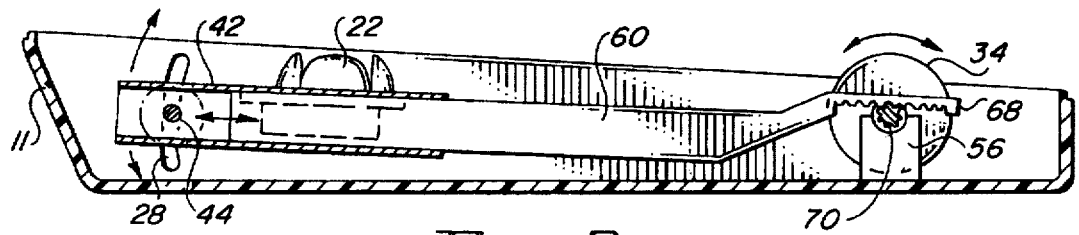
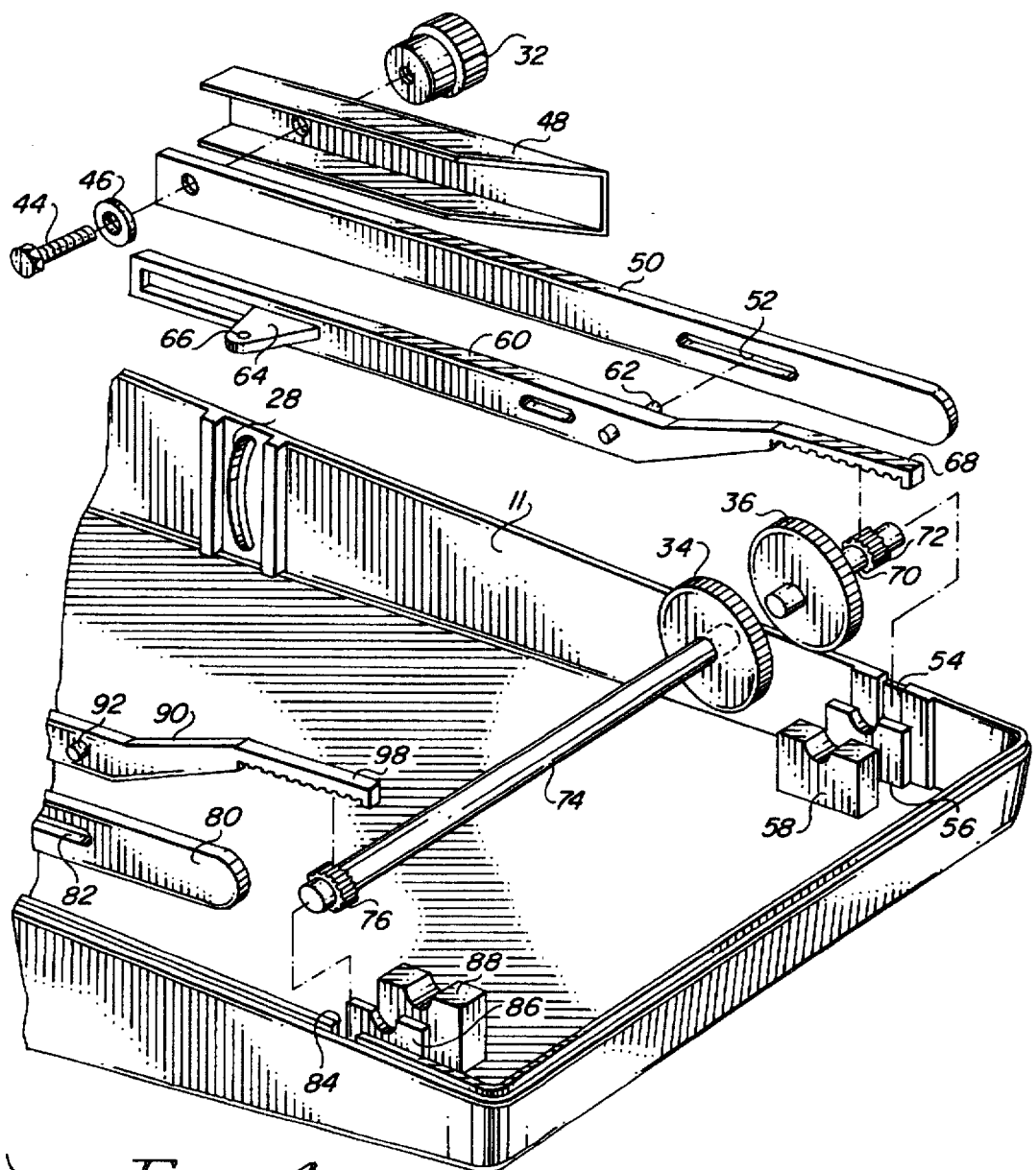

ADJUSTABLE KEYBOARD

BACKGROUND

An ergometrically improved keyboard for a computer is disclosed in the U.S. Pat. Nos. 4,913,573 and 4,917,516 to Retter. The keyboards which are disclosed in these patents comprise a pair of independent keyboard devices, one for each hand, which have a housing with a raised, substantially convex central portion adapted to underlie and support the palm of a hand of an operator in a natural, relaxed, concave position. In this position, the thumb rests along one side of the raised central portion and the fingertips of the operator extend substantially vertically downwardly into finger wells, which have data keys mounted in the bottom and in four different positions on the sides of the wells to produce keyed input data to the computer.

The keyboards of the Retter patents function without requiring the operator to move his or her hand from the original relaxed position at any time during the operation of the entry of alphanumeric data and function control information from the keyboard. These keyboards have met with substantial success for a variety of reasons.

One of the most important results from the keyboards of the above identified Retter patents is the significant reduction in the possibility of carpal tunnel syndrome injuries for operators of the Retter keyboards compared with operators of standard computer keyboards. At least part of the reason for this is the full support given to the hand of the operator at all times, since the palm of the hand rests on or presses downwardly onto the top of the housing. In addition, the fingers undergo only relatively minor front, back, side-to-side and downward motions within each of the finger wells. Another benefit of the Retter keyboards is increased operating speed and absolute maintenance of "home" position, since the hands of the operator never leave the keyboard or move from place to place on it at any given time.

Even though the keyboards of the Retter patents are becoming increasingly popular, it has been found that when a fixed position of the finger wells relative to the central hand support portion is established, as shown in the keyboards of both of the above identified Retter patents, the most relaxed or normal hand positions may not exist for persons with either very small hands or short fingers, or for persons with very large hands or long fingers. Consequently, it is desirable to provide improvements to the keyboards of the above mentioned patents to increase the comfort level of operators having a wide range of hand sizes.

SUMMARY OF THE INVENTION

It is an object of this invention to provide an improved computer data entry device.

It is another object of this invention to provide an improved data entry keyboard device which is adjustable.

It is an additional object of this invention to provide an improved data entry keyboard device of a type in which the hand always remains in one structurally specified "home" position, from which it need not be moved, for performing multiple operations and which is adjustable to accommodate operators having different hand sizes.

It is a further object of this invention to provide an improved keyboard including a raised central portion for underlying the palm of the hand of an operator and including data input keys arranged in a plurality of groups in three dimensional patterns in each of the fingertip positions, in which the relative location of the groups of data input keys to the convex hand support portion is adjustable.

In accordance with a preferred embodiment of the invention, a data input control mechanism includes a housing with a base and a top. The top overlies and is attached to the base. The top also has a raised, substantially convex central portion adapted to underlie and support the palm of a hand of an operator in a natural, relaxed, concave position; so that the fingertips of each finger extend substantially vertically downwardly through an aperture in the top. A data input key support member is located in the housing, beneath the aperture in the top portion. This key support member has a plurality of groups of data input keys arranged in three-dimensional patterns on it at each of the fingertip positions of the hand of an operator. Each of the groups of keys is operated by different fingertips of the operator. Actuators are coupled between the housing and the key support member for adjusting the positions of the groups of keys in at least two generally perpendicular directions relative to the aperture in the top portion.

BRIEF DESCRIPTION OF THE DRAWING

FIG. 3 is a cross-sectional view taken along the line 3—3 of FIG. 2; and

FIG. 4 is a partially exploded view illustrating details of the device shown in FIGS. 1 through 3.

DETAILED DESCRIPTION

Reference now should be made to the drawings, in which the same reference numbers are used throughout the different figures to designate the same components. The subject matter of U.S. Pat. Nos. 4,913,573 and 4,917,516 also is incorporated herein by reference, since these patents disclose the overall operation of keyboards of the type which are shown in FIGS. 1 through 4.

Figure 1:
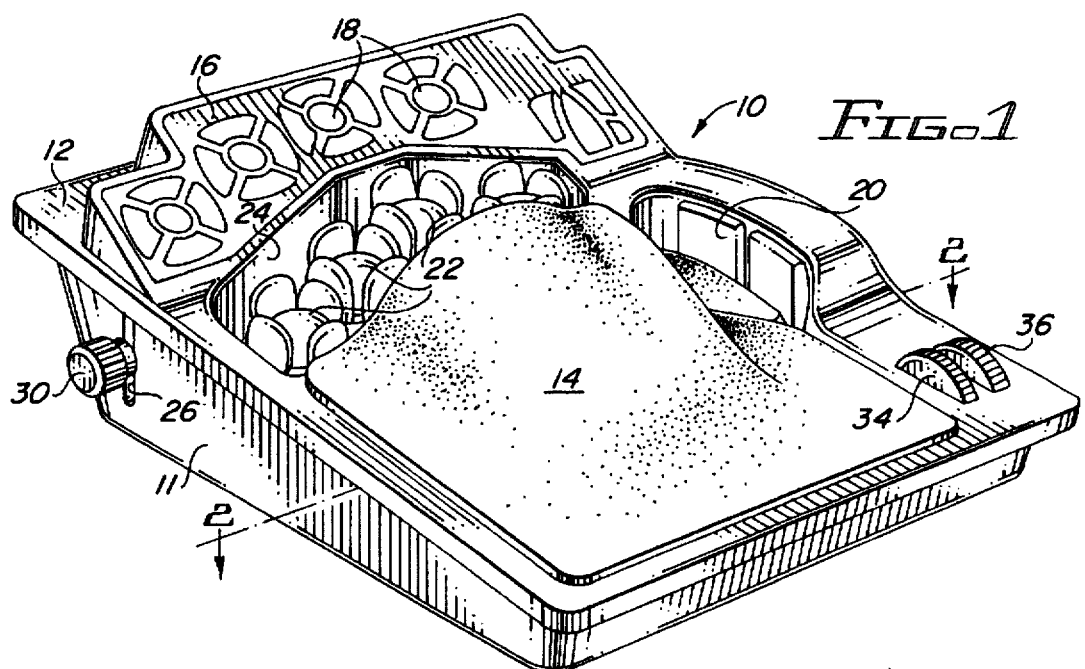
FIG. 1 is a top perspective view of a preferred embodiment of the invention.

Referring now to FIG. 1, an ergometrically improved computer or typewriter keyboard 10 for the left hand and of the type generally shown in U.S. Pat. Nos. 4,913,573 and 4,917,516 is illustrated. The housing consists of a base portion 11, which is illustrated as having upstanding sides and front and back ends. The base portion 11 is illustrated as being higher at its front (left-hand) end and lower at its rear (right-hand) end. A housing top 12 then is secured to the base 11 at fastening points 35, 37, 38, and 40, to form an enclosed keyboard structure. Although the drawings depict only the left-hand portion of the keyboard system, it is understood that an identical mirror image unit for the right hand also is employed for a full keyboard system.

The top 12 includes a raised, substantially convex central portion 14, which is adapted to underlie the palm of the hand of an operator in a natural, relaxed position. As explained in U.S. Pat. Nos. 4,913,573 and 4,917,516, when the hand of an operator is placed on the central portion 14, the fingers extend downwardly into four finger wells 22 and the thumb fits into a thumb well 20 located alongside the raised central portion 14. The details of the operation of the keys located in each of the finger wells 22 and the thumb well 20 are provided in the above mentioned patents, and do not constitute a part of the present invention. For that reason, the details of the operation of the various keys and their relationships to one another is not provided here.

At the location of the finger wells 22, an aperture 24 of a generally chevron shape is formed through the top 12. The finger wells 22 in turn are mounted on a key support member 42 (shown most clearly in FIG. 2) located inside the housing, beneath the aperture 24.

Also as shown in FIG. 1, the keyboard includes a raised display panel 16 having groups of display indicia 18, which correspond to the different keys located in the finger wells 22 and the thumb well 20 of the keyboard. These displays function much in the same way as the letters and numbers appearing on the tops of keys of a conventional keyboard to assist operators of the keyboard in locating various letters, numbers and functions which are actuated by operating corresponding ones of the keys in the thumb well 20 and the finger wells 22.

It has been found that providing a fixed position of the finger wells 22, relative to the central palm rest portion 14, may result in some possible discomfort, particularly for persons having hands at either of these extremes. In order to accommodate hands of operators of different sizes, ranging from relatively small hands with short fingers to large hands with long fingers, the adjustable keyboard shown in the drawings is made to permit movement of the key support member 42 generally up and down in a vertical plane relative to the aperture 24 and the palm rest 14, and also back and forth in a generally horizontal direction to cause the key support member to move toward and away from the central palm rest portion 14. In addition, the key support member 42 may be moved by different amounts at either end to cause a twisting adjustment of the location of the key wells 22, until the ideal position for a particular operator is achieved.

Figure 2:
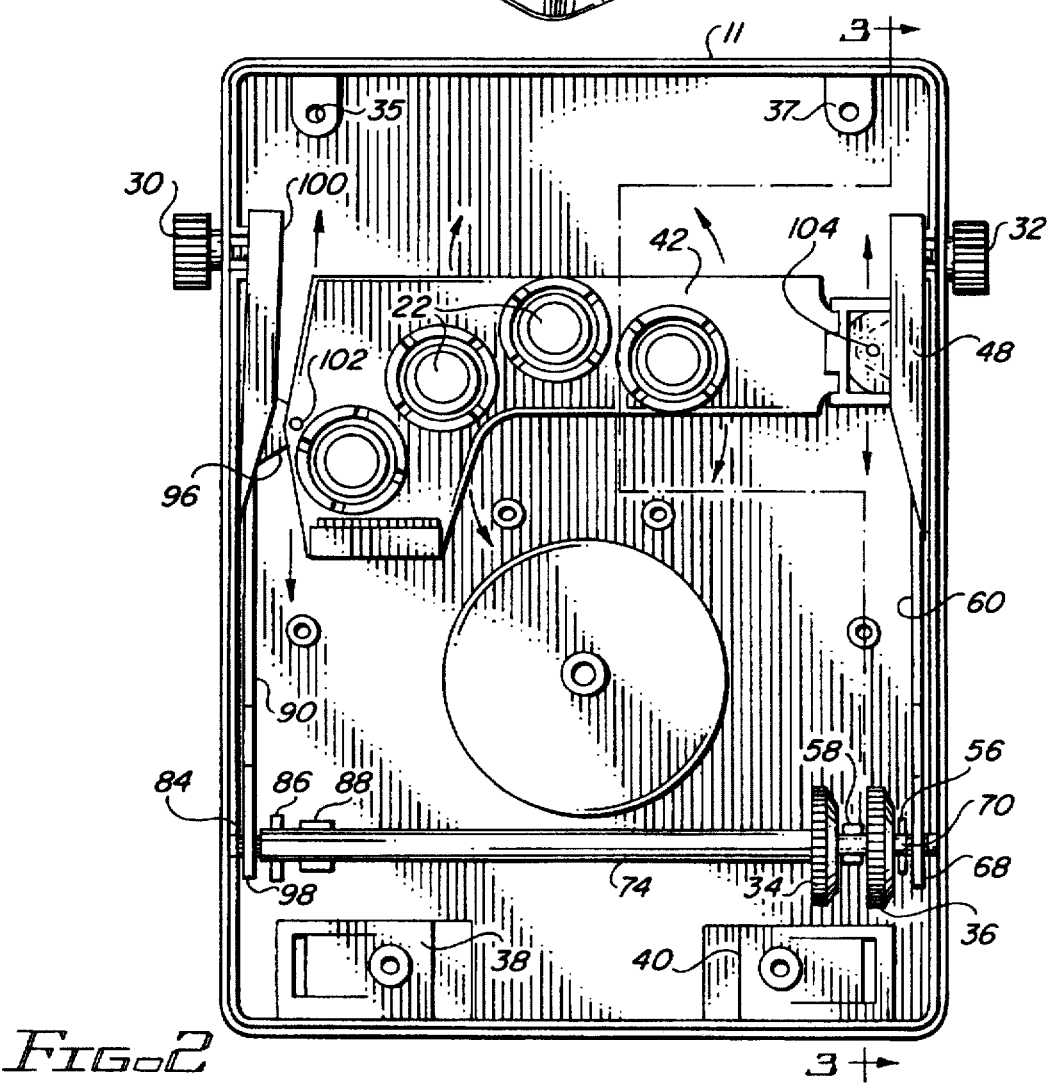
FIG. 2 is a top view of the embodiment shown in FIG. 1 with the top portion removed along the line 2—2 of FIG. 1.

The manner in which this adjustment is effected is best illustrated in FIGS. 2, 3 and 4. The key support member 42 is pivotally attached at its left and right sides (as viewed in FIG. 2) at pivot points 102 and 104 to a projection 96 on an elongated lever arm 90 and to a pivot 66 on a projection 64 on an elongated lever arm 60 located, respectively, on the left-hand and right-hand sides of the housing, as illustrated in FIGS. 2 and 4.

The right-hand ends of the lever arms 60 and 90, as viewed in FIGS. 3 and 4, terminate in rack gears 68 and 98, respectively, driven by rotating pinion gears 72 and 76, respectively. The gears 72 and 76 in turn are mounted on shafts 70 and 74, which are rotated by a pair of actuator or operating wheels 36 and 34, respectively. As shown in FIG. 1, the wheels 34 and 36 extend through the upper surface of the housing 12 at the lower right-hand corner.

Support for the shafts 70 and 74 is provided by support blocks 56, 58, 86 and 88, as shown in FIGS. 2, 3 and 4. When the top 12 of the housing 10 is in place, the under surface of the top 12 slidably rests against the top portions of the rack gears 68 and 98 to hold them in contact with the rotating pinion gears 72 and 76, respectively. Thus, as the actuator wheels 34 and 36 are rotated clockwise and counterclockwise, the levers 60 and 90 are moved back and forth from front to back in the housing, in the direction of the arrows shown in FIGS. 2 and 3. This movement as is guided and controlled by a pin 62 on the lever arm 60 moving in a slot 52 in a pivot arm 50; and by a pin 92 on the lever arm 90 moving in a slot 82 on a pivot arm 80.

The opposite ends (the left-hand ends shown in FIGS. 3 and 4) of the lever arms 60 and 90 slide in respective carriers 48 and 100. The carriers 48 and 100 also carry, respectively, the of elongated pivot arms 50 and 80, which extend in the space between the support blocks 56 and 54 on the right-hand side of the housing and between the support blocks 86 and 84 on the left-hand side of the housing. The ends of the lever arms 50 and 80 are located beneath the ends of the shafts 70 and 74 and are held captive in this position when the device is fully assembled.

It is seen that the levers 50 and 80 are located between the respective carriers 48 and 100 and the corresponding rack levers 60 and 90. The various parts are held together at the left-hand end (as shown in FIGS. 3 and 4) or the upper end (as shown in FIG. 2) by means of bolts, such as the bolt 44, which extends through a washer 46 and then through a slot in the lever arm 60, a hole in the arm 50, and a corresponding hole in the bracket 48 to be secured by an internally threaded knurled operator 32 for the right-hand side of the housing shown in FIGS. 2 and 4. A similar structure is used to secure the lever arms 80, 90 and bracket 100 together with a knurled, internally threaded operator 30 on the left-hand side of the housing, as shown in FIGS. 1 and 2. Since the structure for the left-hand side is identical to that of the right-hand side, only the right-hand side has been shown in detail in FIG. 4.

As illustrated in FIG. 3, the shaft of the bolt 44 extends through a generally vertically oriented arcuate slot 28 in the right-hand side of the bottom 11 of the housing 10. When the knurled operator 32 is loosened, carrier 48 shown in FIGS. 3 and 4 may be moved up and down in the direction of the arrows shown in the slot 28 to any desired position. This raises and lowers the levers 50 and 60. As illustrated in FIG. 3, this causes the finger wells 22 on the key support member 42 to be raised and lowered relative to the aperture 24 in the top 12 of the housing 10, since the top 12 is mounted in a fixed position relative to the base 11.

A similar operation is effected on the left-hand side of the housing by means of the knurled adjustment operator 30 moving the carrier 100, and therefore the left-hand end of the key support member 42 generally vertically up and down in the arcuate slot 26 formed in the left side of the base 11 of the housing.

From the foregoing it can be seen that independent vertical (up and down) adjustment of the left and right ends of the key support member 42 may be effected by moving the shafts attached to the knurled operators 30 and 32 up and down in the slots 26 and 28. Once the desired adjustment is effected, the knurled operators 30 and 32 are tightened to secure the vertical position of both ends of the key support member 42 in place. As is readily apparent from an examination of the drawings, the generally vertical adjustments of the left and right hand ends of the key support member 42 may be effected to cause a tilting from left to right or from right to left of the key support member 42, and therefore, of the four key wells 22, which are mounted on it. In the alternative, the key support member 42 may be adjusted by the same amount on either side to cause it to be horizontal, but at different planes relative to the palm support 14 on the upper surface of the top 12 of the keyboard.

A similar back-and-forth or front to back adjustment of the left-hand end and right-hand end of the key support member 42 also may be effected to cause either or both ends of the key support member 42, and therefore the finger wells 22, to be moved toward and away from the palm support 14 within the aperture 24. This movement is effected as explained previously by the rotation by the wheels or actuators 34 and 36. Since the shaft 44 of the bolt extends through a slot (shown most clearly in FIG. 4) in the actuator 60 (and a similar slot in the actuator 90), relative adjustment in the back-and-forth direction of either or both ends of the key support member about the pivots 102 and 104 is effected independently of the vertical adjustments effected by means of the movements up and down in the arcuate slots 26 and 28, as described previously.

The foregoing description of the preferred embodiment of the invention is to be considered as illustrative and not as limiting. Various changes and modifications will occur to those skilled in the art the art for performing substantially the same function, in substantially the same way, to achieve substantially the same result without departing from the true scope of the invention as defined in the appended claims.

What is claimed is:

1. An adjustable data input control mechanism including in combination:

a housing having a base portion and a top portion overlying and attached to said base portion, said top portion having an aperture in it;

a raised, substantially convex central portion on said top portion of said housing adapted to underlie and support the palm of a hand of an operator in a natural, relaxed, concave position; so that the fingertips of each finger extend substantially vertically downwardly from said central portion through the aperture in said top portion;

a data input key support member located in said housing beneath the aperture in said top portion and having a plurality of groups of data input keys arranged in three-dimensional patterns thereon at each of the fingertip positions of the hand of such operator, with each group of keys operated by different fingertips; and an actuator coupled between said housing and said key support member for adjusting the position of said key support member, and said groups of keys arranged thereon, in at least two substantially perpendicular directions relative to said aperture in said top portion.

2. The combination according to claim 1 wherein said actuator comprises at least one first actuator for raising and lowering said key support member in said housing and at least one second actuator for moving said key support member back and forth in a direction toward and away from said convex central portion on said upper portion of said housing in a plane generally perpendicular to the plane of movement effected by said first actuator.

3. The combination according to claim 2 wherein said housing has first and second sides and said key support member has first and second ends generally adjacent said first and second sides, respectively, and further wherein said first actuator comprises first and second actuator parts coupled with said first and second ends, respectively, of said key support member for independently raising and lowering said first and second ends, respectively, in said housing; and said second actuator comprises first and second actuator parts coupled with said first and second ends of said key support member for independently moving said first and second ends of said key support member back and forth in a direction perpendicular to the direction of movement effected by said first and second parts of said first actuator.

4. The combination according to claim 3 wherein said actuators are manually operated from outside said housing.

5. The combination according to claim 3 wherein said first and second actuator parts of said first actuator are located on opposite sides of said housing and are independently moved in a substantially vertical direction, and said first and second actuator parts of said second actuator have operators extending through said housing for independently moving said first and second ends of said key support member back and forth in a generally horizontal plane.

6. The combination according to claim 3 wherein said first and second actuator parts of said first actuator comprise pivoted levers.

7. The combination according to claim 3 wherein said first and second actuator parts of said second actuator comprise first and second slide levers pivotally coupled to the first and second ends, respectively, of said key support member.

8. The combination according to claim 7 wherein said first and second slide levers comprise rack gears and further including first and second pinion gears engaging said rack gears and operated from rotating wheels extending through said housing for moving said rack gears back and forth.

9. The combination according to claim 4 wherein said first and second actuator parts of said first actuator are located on opposite sides of said housing and are independently moved in a substantially vertical direction, and said first and second actuator parts of said second actuator have operators extending through said housing for independently moving said first and second ends of said key support member back and forth in a generally horizontal plane.

10. The combination according to claim 9 wherein said first and second actuator parts of said first actuator comprise pivoted levers.

11. The combination according to claim 10 wherein said first and second actuator parts of said second actuator comprise first and second slide levers pivotally coupled to the first and second ends, respectively, of said key support member.

12. The combination according to claim 11 wherein said first and second slide levers comprise rack gears and further including first and second pinion gears engaging said rack gears and operated from rotating wheels extending through said housing for moving said rack gears back and forth.

13. The combination according to claim 2 wherein said actuators are manually operated from outside said housing.

* * * * *